US005259532A

United States Patent [19]

Schwarzli

[11] Patent Number: 5,259,532

[45] Date of Patent: Nov. 9, 1993

[54] COIN OPERATED VENDING MACHINE WITH ADJUSTABLE DISPENSING WHEEL

[75] Inventor: Josef W. Schwarzli, Stouffville, Canada

[73] Assignee: Machine-O-Matic Limited, Newmarket, Canada

[21] Appl. No.: 983,315

[22] Filed: Nov. 30, 1992

[51] Int. Cl.[5] .............................................. C07F 11/24

[52] U.S. Cl. .................................... 221/304; 221/203; 221/207; 221/265

[58] Field of Search ............... 221/200, 202, 203, 206, 221/207, 263, 264, 265, 277, 304; 222/305

[56] References Cited

U.S. PATENT DOCUMENTS

| | | | |
|---|---|---|---|
| 4,150,766 | 4/1979 | Westendorf et al. | 221/265 X |
| 4,460,106 | 7/1984 | Moulding, Jr. et al. | 221/265 X |
| 4,613,057 | 9/1986 | Sacchetti et al. | 221/265 |
| 5,086,945 | 2/1992 | Corella | 221/207 X |
| 5,176,290 | 1/1993 | Schwarzli | 221/200 X |

FOREIGN PATENT DOCUMENTS 2660288 10/1991 France .

*Primary Examiner*—Robert P. Olszewski
*Assistant Examiner*—Dean A. Reichard
*Attorney, Agent, or Firm*—Ridout & Maybee

[57] ABSTRACT

In a bulk vendor having a dispensing wheel for carrying merchandise to a dispensing aperture, containers in the dispensing wheel are adjustable in size according to the size and volume of merchandise to be dispensed. An adjusting wing is rotationally secured to the dispensing wheel by a retractable pin, which when depressed permits the adjusting wing to rotate relative to the dispensing wheel and change the container size, either manually or with the use of a tool provided for this purpose.

9 Claims, 8 Drawing Sheets

COIN OPERATED VENDING MACHINE WITH ADJUSTABLE DISPENSING WHEEL

FIELD OF THE INVENTION

This invention relates to coin operated vending machines. In particular, this invention relates to a coin operated vending machine having a dispensing wheel with containers for carrying articles to be dispensed, whereby the containers are adjustable in size to accommodate varying amounts or sizes of merchandise.

BACKGROUND OF THE INVENTION

Coin operated vending machines, so-called "bulk vendors", are widely used to dispense a variety of merchandise, from confectionaries and snack foods to toys. In order to design a bulk vendor which is capable of dispensing such a wide variety of merchandise, it is desirable that the volume of containers within a dispensing wheel be adjustable, to accommodate merchandise of different sizes and to allow the operator to select the amount of any particular type of merchandise which will be dispensed with a single turn of the coin mechanism.

In a conventional bulk vendor, containers for carrying articles to be vended are formed within the spaces between spokes in a dispensing wheel. The dispensing wheel revolves with each turn of a coin operated gear mechanism, advancing the next container to a dispensing aperture. Overlaying the dispensing wheel is an adjusting wing, provided with openings so that articles in the product bin will fall into empty containers as the wheel revolves. Each container is defined by the hub of the dispensing wheel, the rim of the dispensing wheel, a leading wall formed by a spoke of the dispensing wheel, and a trailing wall depending from the adjusting wing into the space between the spokes.

Each container is adjustable in size by rotating the adjusting wing relative to the dispensing wheel. This moves the trailing walls closer to or further from the leading walls of the containers, reducing or increasing the containers' size. In a typical bulk vendor the dispensing wheel is provided with an arc of notches in which a projection from the adjusting wing is seated, in order to set the container size. The size of the containers may then be changed by lifting the adjusting wing slightly from the dispensing wheel and dropping it back in the desired position, such that the projection extending from the adjusting wing engages a different notch in the dispensing wheel. The container size will be selected by the operator according to the size of the merchandise being dispensed and the number of articles to be dispensed with each turn of the coin mechanism. Such a design is well known to those skilled in the art.

However, there are disadvantages inherent in this design. The adjusting wing is retained against the dispensing wheel, thus ensuring that it remains in the selected position, by the hub of an agitator used to create a flow of articles in the product bin. Thus, in order to reset the size of the containers in the dispensing wheel, the entire upper assembly of the vendor must be dismantled, and the agitator removed from its axle, allowing the adjusting wing to be lifted from the dispensing wheel.

The present invention overcomes these disadvantages. The invention provides an adjusting wing overlying a dispensing wheel and rotationally fixed thereto by a retractable locking pin extending from the dispensing wheel and engaging one of a series of holes in the adjusting wing. Thus, service personnel can alter the size of the containers in the dispensing wheel merely by depressing the pin until it disengages the adjusting wing and then rotating the adjusting wing relative to the dispensing wheel. In a preferred embodiment, a peripheral wheel retainer plate is provided with notches adapted to be engaged by a toothed pin depressing tool, to enable service personnel to accurately adjust the size of the containers in small, controlled increments. While the product bin must be emptied the adjusting wing does not need to be lifted off the dispensing wheel in order to effect this adjustment, and therefore no dismantling of the apparatus is required other than removal of the top or front panel of the product bin to allow access to the dispensing wheel.

SUMMARY OF THE INVENTION

The present invention provides a bulk vendor having a product bin disposed above a dispensing wheel having containers for advancing articles contained in the product bin toward a dispensing aperture disposed beneath the dispensing wheel, the dispensing wheel comprising a series of evenly spaced compartments, an adjusting wing having evenly spaced container openings formed therein and a barrier wall depending from an edge of each container opening into one of said compartments in the dispensing wheel, said adjusting wing being releasably fixed rotationally to said dispensing wheel and defining a container beneath each container opening in the adjusting wing, whereby the size of the containers may be adjusted by rotating the adjusting wing relative to the dispensing wheel, and whereby means for rotationally fixing the adjusting wing to the dispensing wheel comprises a depressible pin engaged between the dispensing wheel and the adjusting wing.

BRIEF DESCRIPTION OF THE DRAWINGS

In drawings which illustrate by way of example only a preferred embodiment of the subject invention.

DETAILED DESCRIPTION OF THE INVENTION

Figure 1:
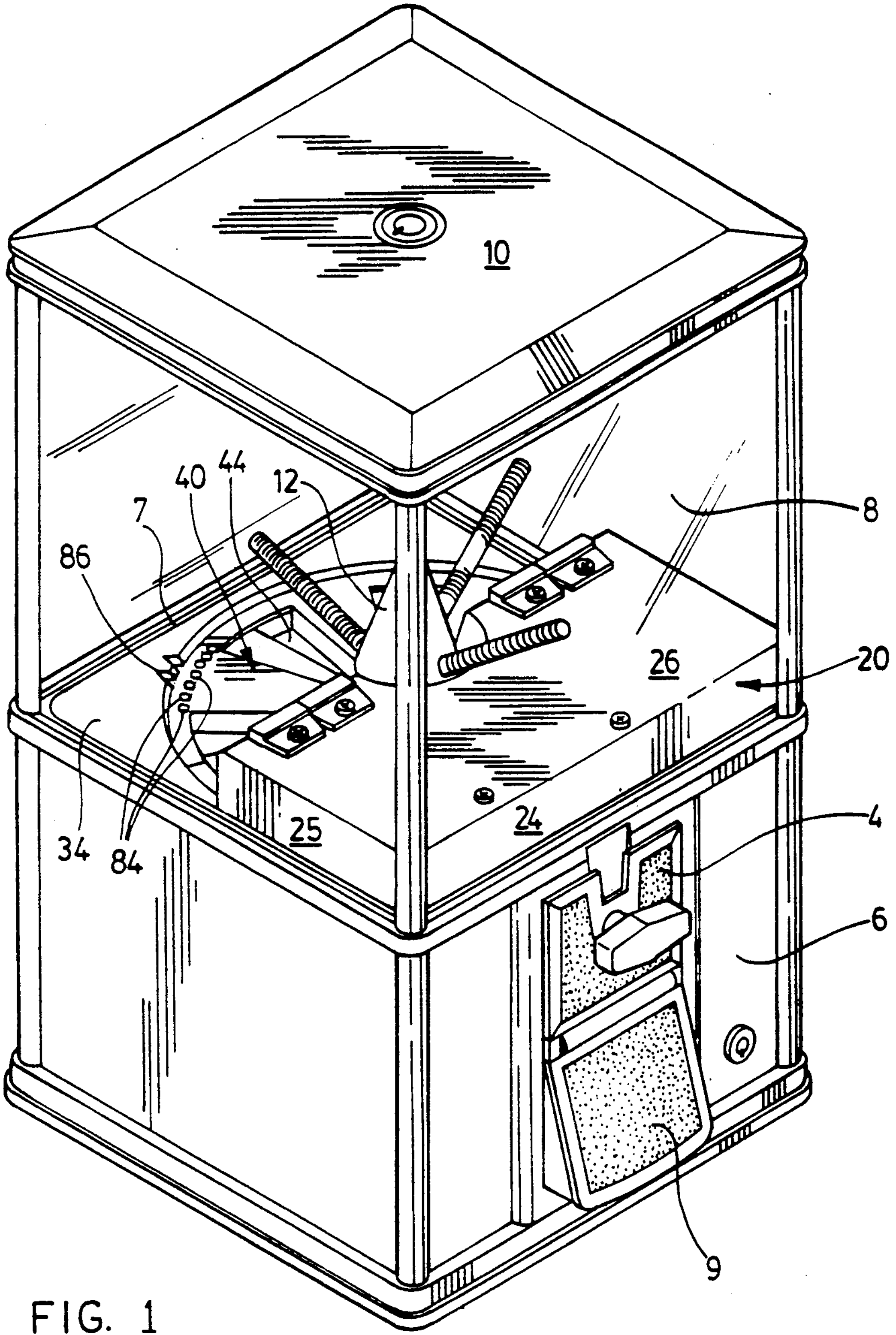
FIG. 1 is a perspective view of a bulk vendor embodying the subject invention.

FIG. 1 illustrates a typical bulk vendor, conventionally comprising a dispensing wheel actuated by a coin operated gear mechanism 4 contained in a lower housing 6. A product bin 8 is disposed above the lower housing 6 and separated therefrom by a dividing plate 7 and includes a locking top panel 10. An agitator 12 is engaged to the hub 42 of the dispensing wheel 40, to create a flow of product in the product bin 8 as the dispensing wheel 40 is advanced with each turn of the coin mechanism 4. As a container 44 in the dispensing wheel 40 is advanced to the dispensing aperture 16, articles in the container 44 fall down a dispensing chute (not shown) and are retrieved by lifting a cover 9.

Figure 2:
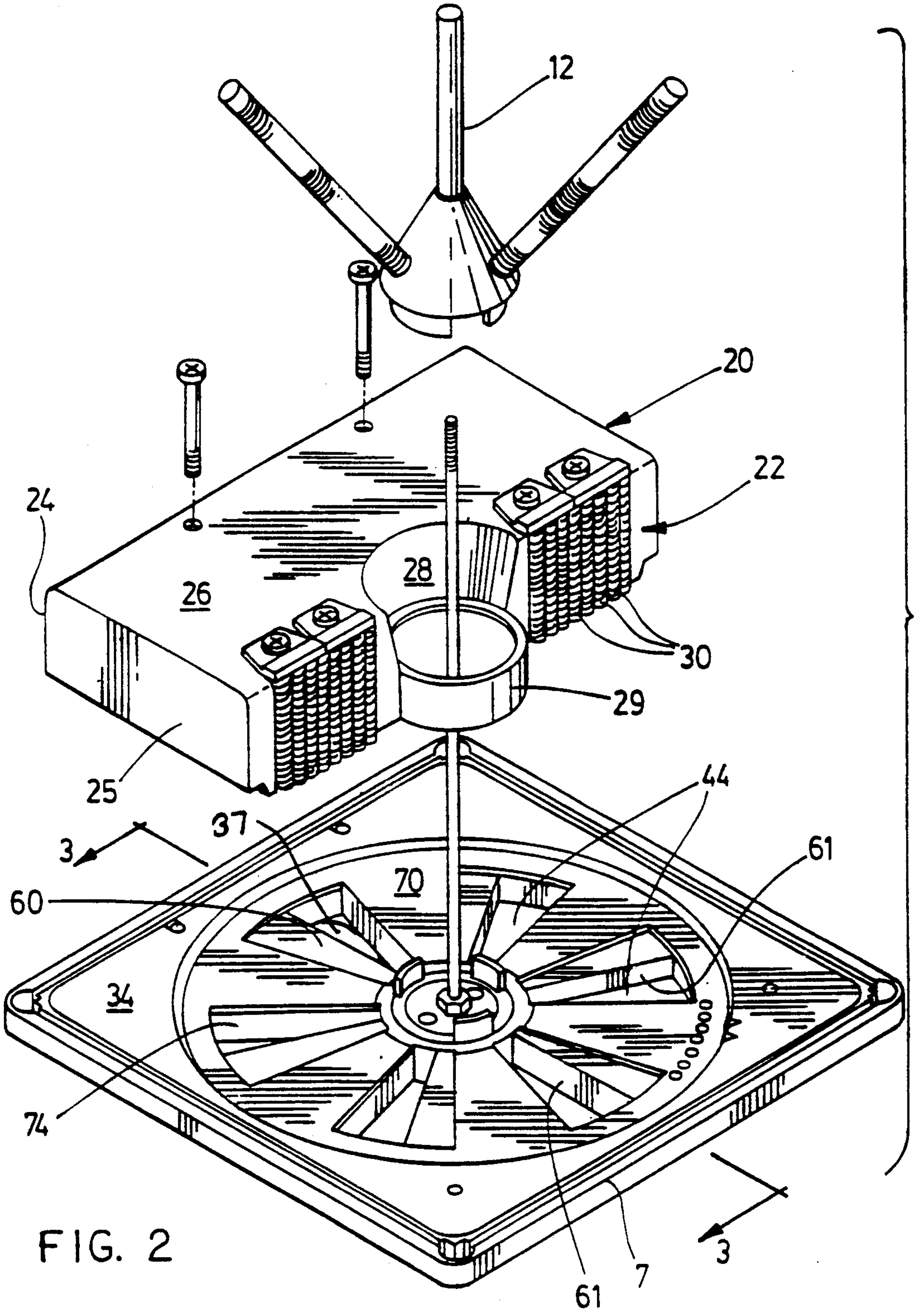
FIG. 2 is an exploded view showing details of a preferred form of brush housing.
Figure 3:
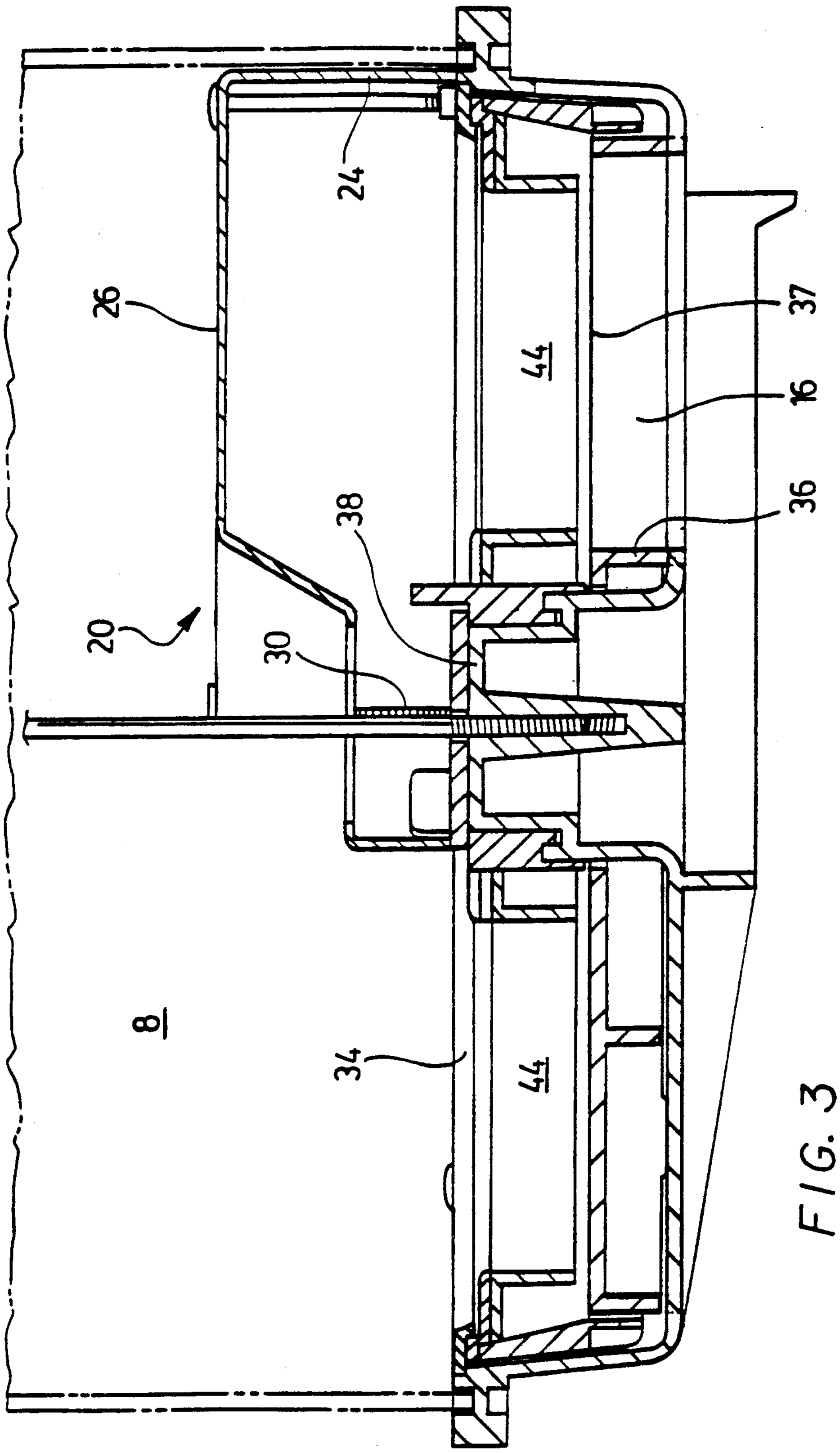
FIG. 3 is a cross-section taken along the line 3—3 in FIG. 2.

A brush housing 20, best illustrated in FIG. 2, is anchored to the dividing plate 7 above the dispensing wheel, to ensure that only articles contained within a container 44 in the dispensing wheel 40 can be dispensed through the dispensing aperture 16. In a preferred embodiment the brush housing 20 comprises a front face 22, a rear face 24, sides 25 and a top 26, and extends beyond the peripheral edge of the dispensing wheel 40. The front face 22 includes a depression 28 within which the agitator 12 can revolve freely. Openings in the front face 22 on both sides of the depression 28 are each provided with a curtain of resilient members 30, conventionally known as brushes, which deflect loose articles in the product bin 8 away from the brush housing 20 but permit the passage into the brush housing 20 of articles contained within a container 44 in the dispensing wheel 40.

The brushes 30 are resilient to accommodate oddly shaped or oversized articles carried in a container 44, which will slightly deflect the brushes 30 upon entering the housing 20. For loose articles sitting on top of the dispensing wheel 40, however, the brushes 30 are sufficiently rigid to prevent access into the brush housing 20 and thus to prevent access to the dispensing aperture 16. The rear portion of the brush housing 20 may be anchored to any convenient portion of the vendor, preferably the dividing plate 7 as shown in FIG. 2, and the recess 28 in the front face 22 of the brush housing 20 has an annular retaining ring 29 which is anchored in position by the agitator 12.

Because the dispensing wheel 40 revolves in only one direction (clockwise in the embodiment illustrated), it is only strictly necessary to include a single set of brushes 30, in the side of the front face 22 of the brush housing 20 toward which the dispensing wheel 40 advances. However, there is a certain amount of "play" in the coin mechanism 4, which permits the dispensing wheel 40 to be rotated some small amount in either direction, even when no coin has been inserted. Loose articles sitting on the dispensing wheel 40 can become jammed between the dispensing wheel 40 and the bottom edge of the front face 22 of the brush housing 20, even through very minor reverse rotation of the dispensing wheel, and it has thus been found to be advantageous to provide a set of deflecting brushes 30 on both sides of the front face 22.

The brush housing 20 preferably covers at least one-half of the dispensing wheel 40, for the same reason; the small amount of "play" in the coin mechanism 4 which permits the dispensing wheel 40 to be advanced slightly in either direction when no coin has been inserted can result in unwanted dispensing of articles. This can be avoided by using a large brush housing 20 to keep loose articles sitting on the dispensing wheel 40 well away from the vicinity of the dispensing aperture 16.

Figure 4:
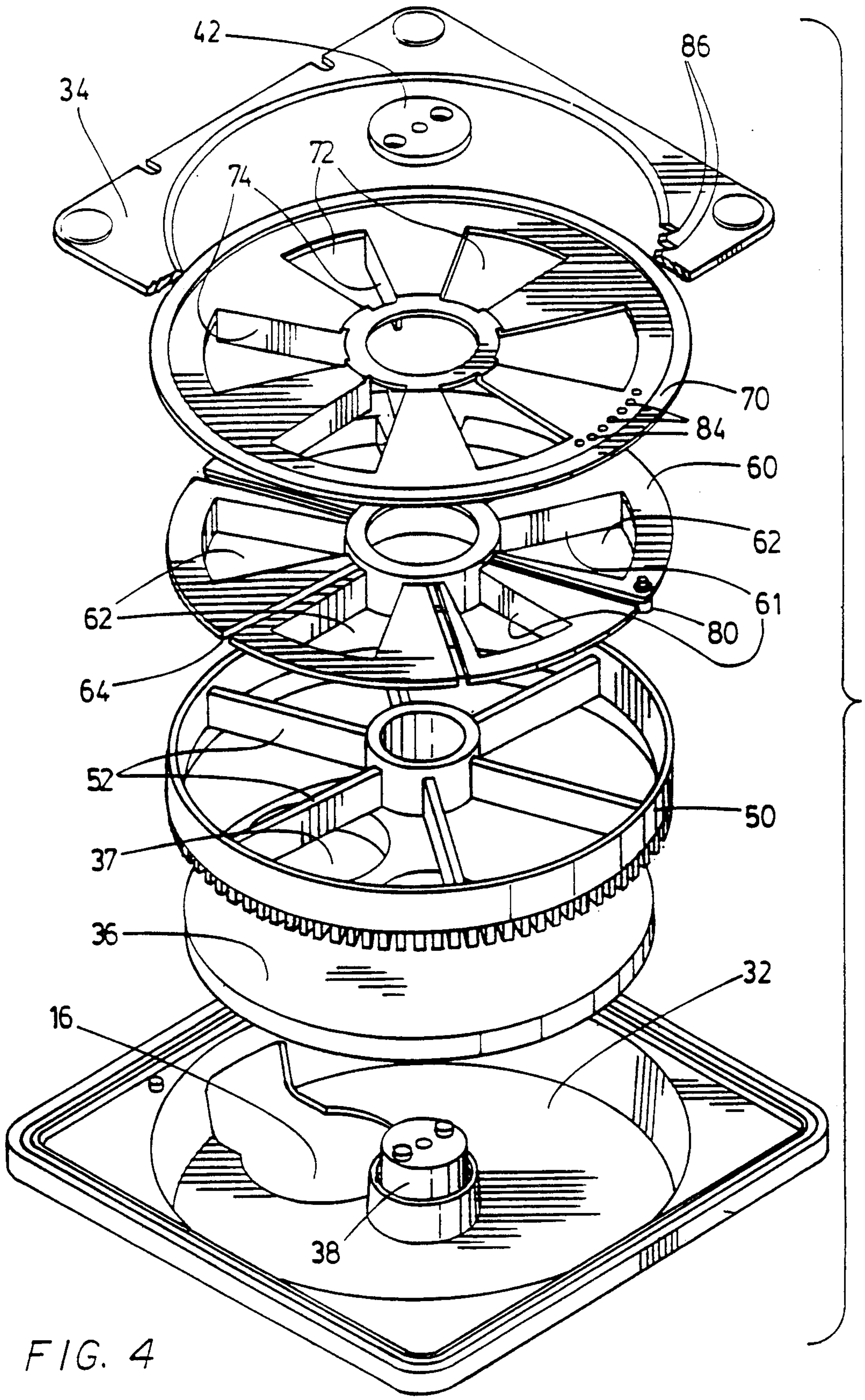
FIG. 4 is an exploded view of the dispensing wheel and adjusting wing.

As illustrated in FIG. 4, the dispensing wheel 40 is seated in a depression 32 formed in the dividing plate 7 which includes the dispensing aperture 16. The periphery of the dispensing wheel is held in place by a wheel retaining plate 34. The dispensing wheel 40 overlays a fixed plastic disc 36, which forms a floor for the containers 44, having a dispensing opening 37 aligned with the dispensing aperture 16. The dispensing wheel 40 revolves above the disc 36, and comprises a toothed wheel 50 actuated by a gear (not shown) in the coin mechanism 4 in conventional fashion, and a wing carrier 60 seated on the toothed wheel 50 which effectively reduces the space between spokes 52 to provide a number of evenly spaced compartments 62 in the dispensing wheel 40. The dispensing wheel 40 and an adjusting wing 70 both revolve around a common axle 38.

Figure 5:
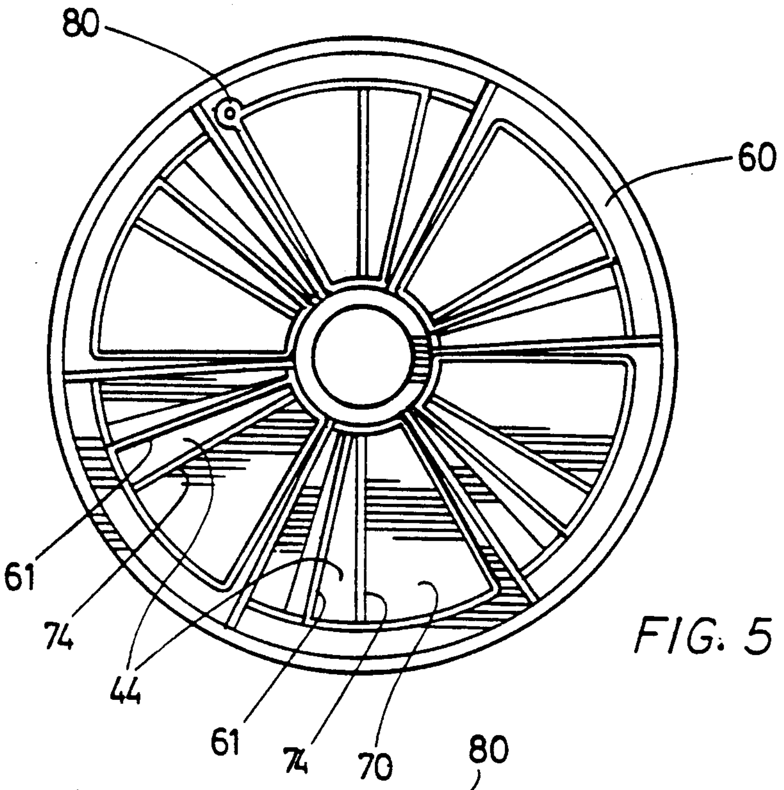
FIG. 5 is a bottom plan view of the dispensing wheel.

The adjusting wing 70 is provided with a series of openings 72 corresponding to the compartments 62 in the wing carrier 60, and each opening 72 in the adjusting wing 70 is provided with a wall 74 depending downwardly into a compartment 62 in the wing carrier 60. Each container 44 available to carry articles extends from the leading wall 61 of the compartment 62 to the wall 74 of the adjusting wing 70, as best seen in FIG. 5. Thus, each 44 effectively comprises that portion of a compartment 62 in the wing carrier 60 which is disposed beneath an opening 72 in the adjusting wing 70, as can be seen in FIG. 2. The containers 44 are adjustable in volume by rotating the adjusting wing 70 relative to the wing carrier 60. This has the effect of increasing or decreasing the amount of the compartment 62 in the wing carrier 60 which is accessible through the opening 72 in the adjusting wing 70.

Figure 6:
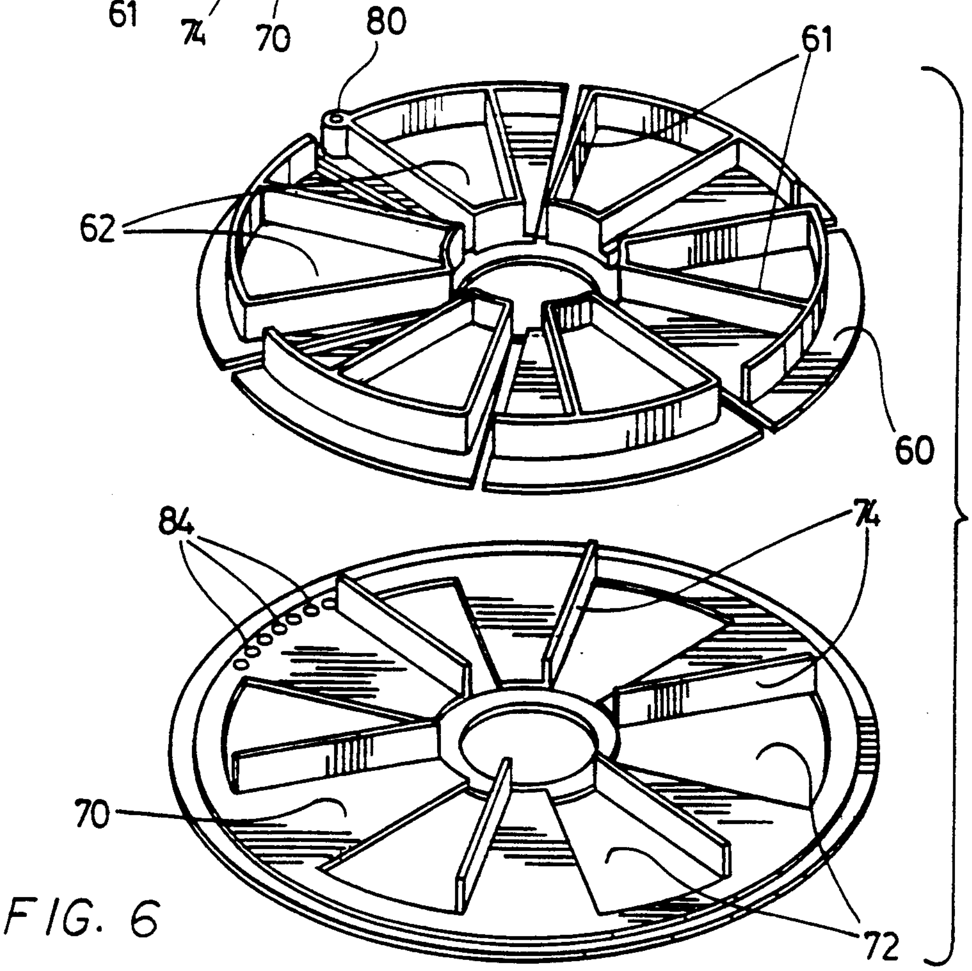
FIG. 6 is an exploded perspective view of the underside of the adjusting wing and wing carrier.
Figure 7:
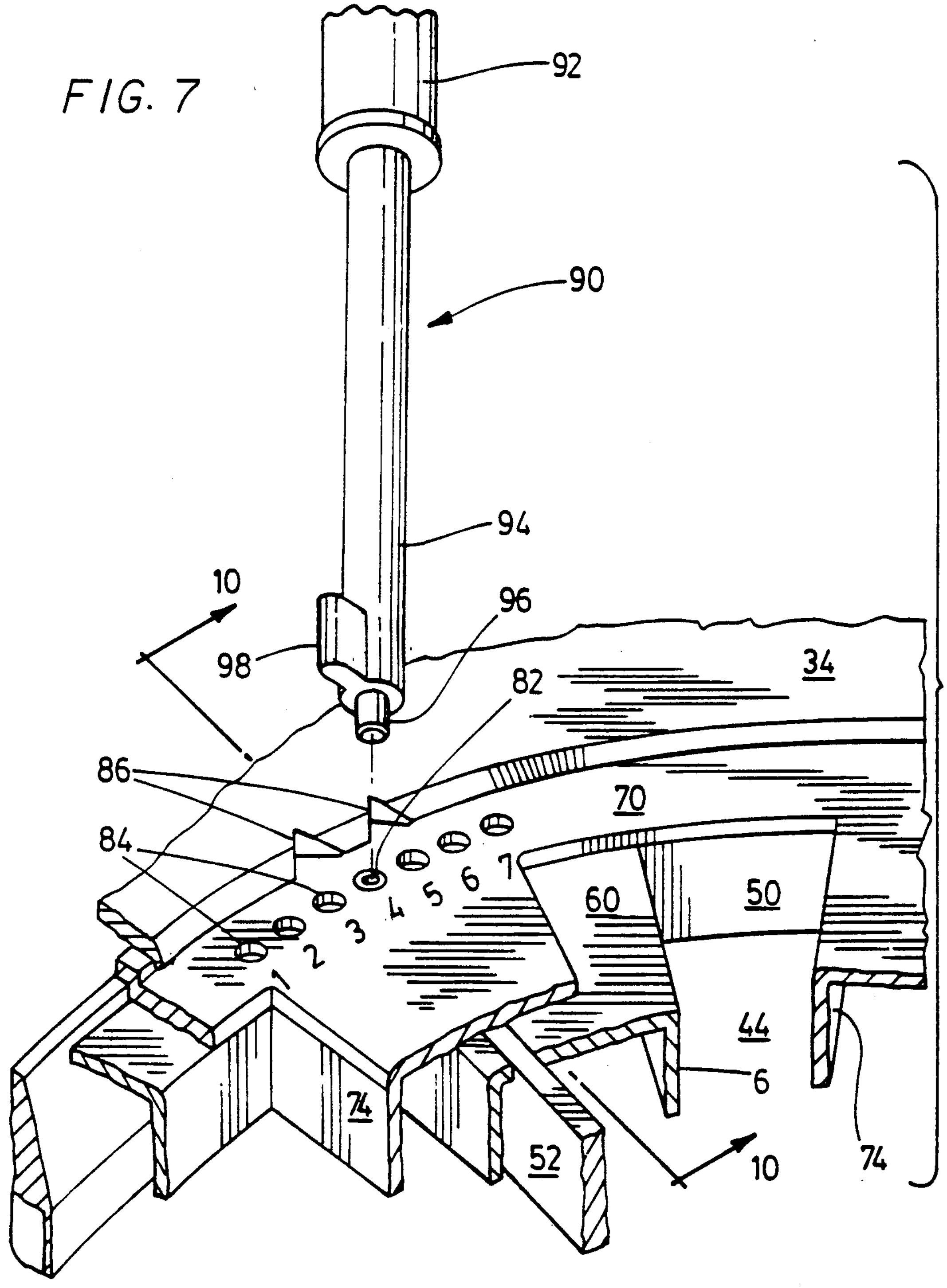
FIG. 7 is a broken away perspective view showing details of the container adjustment mechanism.

According to a preferred embodiment of the present invention, the wing carrier 60 is set on the toothed wheel 50 such that the spokes 52 of the toothed wheel 50 nest in notches 64 formed in the wing carrier 60, best seen in FIG. 6, which prevents the wing carrier 60 from revolving relative to the toothed wheel 50. As noted above, the wing carrier 60 effectively reduces the space between the spokes 52 of the toothed wheel 50 to form compartments 62. It will be apparent that an integral dispensing wheel could be constructed in this fashion, although it is preferred that the toothed wheel 50 be formed from metal for durability, while the wing carrier 60, which may be used to dispense edible foodstuffs, be made of plastic for sanitary reasons.

The adjusting wing 70 is seated on the wing carrier 60 such that the walls 74 (which will form the trailing wall of each container 44) extend downwardly into the compartments 62 in the wing carrier 60. To adjust the size of the containers 44 the adjusting wing 70 can then be rotated relative to the wing carrier 60 utilizing the container adjustment mechanism described below.

The wing carrier 60 is provided with a socket 80 containing a pin 82 biased by a spring 83 to project upwardly from the wing carrier 60. The adjusting wing 70 is provided with a corresponding series of holes 84, circumferentially spaced according to the desired adjusting increments for the containers 44, and positioned along the line of travel of the pin 82. Thus, when the pin 82 is engaged in one of the holes 84, the adjusting wing 70 is retained in a certain fixed position relative to the wing carrier 60, and the containers 44 are fixed at a certain size. To rotate the adjusting wing 70 relative to the wing carrier 60, the pin 82 must be depressed to free the adjusting wing 70 and allow it to be rotated.

Figure 8:
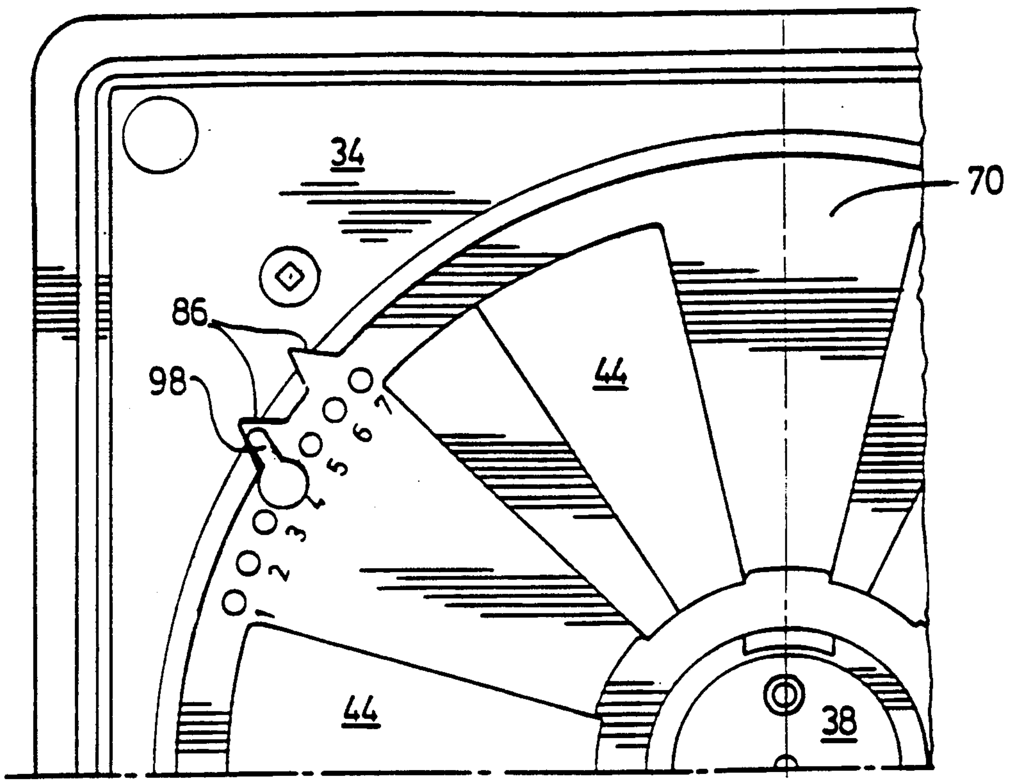
FIGS. 8 and 9 are top plan views showing the operation of the container adjustment mechanism.
Figure 9:
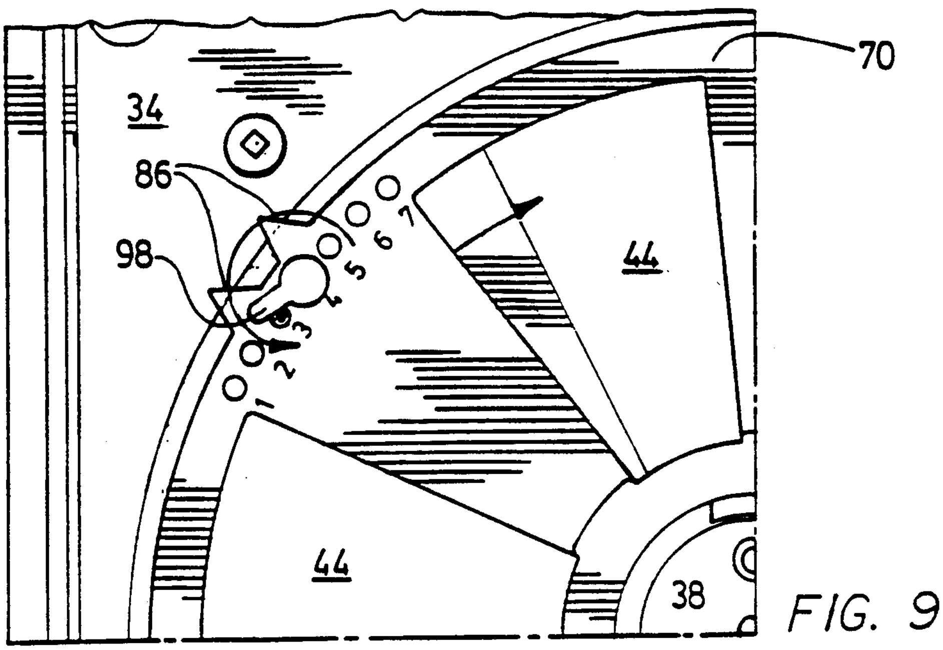

To facilitate this operation a tool 90 is provided, having a handle 92 and a shaft 94 long enough to render the adjusting operation convenient for maintenance personnel. At the end of the shaft 94 is an axial extension 96 approximating the size of the pin 82, and a radial tooth 98 adapted to engage one of two notches 86 in the edge of the wheel retaining plate 34. Thus, to rotate the adjusting wing 70 relative to the wing carrier 60, maintenance personnel will orient the tool 90 so that the tooth 98 engages one of the notches 86 in the wheel retaining plate 34, inserting the extension 96 into the hole 84 containing the pin 82, thus depressing the pin 82 until it completely recedes from the hole 84. Turning the tool 90 causes the adjusting wing 70 to rotate in the opposite direction, as seen in FIGS. 8 and 9. The wing carrier 60 remains fixed because the toothed wheel 50 is locked in place by the gear of the coin mechanism 4. The tool 90 is thus turned until the pin 82 engages the next adjacent hole 84 (corresponding to either a larger or a smaller size of container 44, depending upon the direction in which the tool 90 is rotated). The pin 82 then snaps into its new position in the next hole 84, and the adjusting wing 70 can be further adjusted or, if the desired container size has been reached, the product bin 8 can be refilled.

Figure 10:
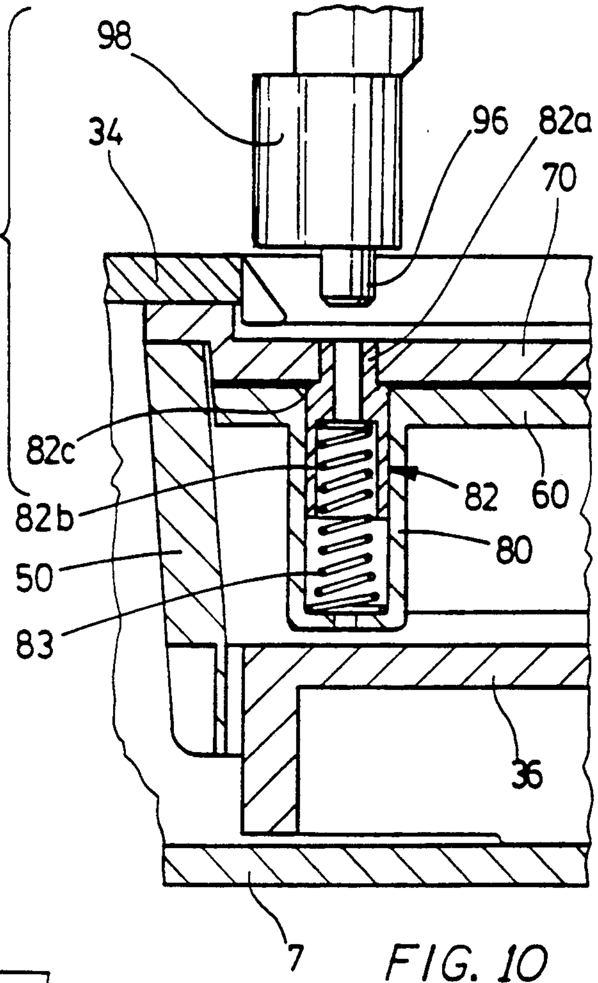
FIGS. 10 and 11 are cross-sections showing details of the pin and socket.
Figure 11:
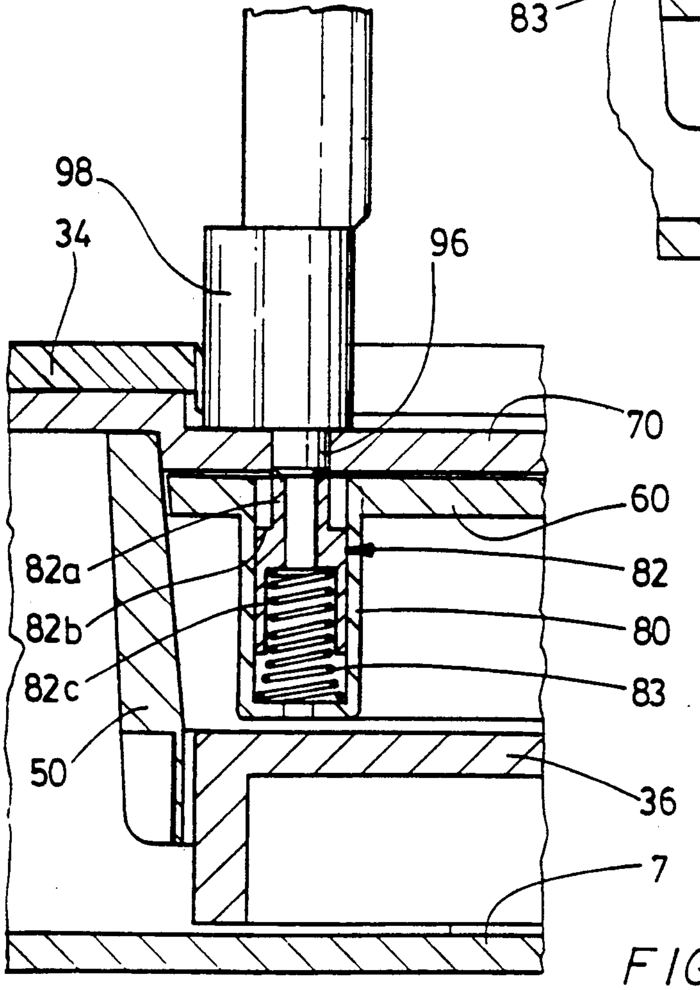

Preferably the pin 82, best illustrated in FIGS. 10 and 11, comprises a hollow member having a head 82*a* which is smaller than its body 82*b*, leaving a shoulder 82*c* which can abut the underside of the adjusting wing 70 to prevent the pin 82 from overextending, as in FIG. 10. The socket 80 formed in the wing carrier 60 is just slightly larger in diameter than the body 82*b* of the pin 82, so that the pin 82 can slide easily within the socket 80. A compression spring 83 is used to bias the pin in a projecting position, and preferably the spring 83 is provided with enlarged ends to frictionally engage the interior of the socket 80 and the body 82*b* of the pin 82, to prevent the pin 82 from becoming dislodged during maintenance or other servicing of the vendor.

The pin 82 is preferably made from stainless steel. The head 82*a* of the pin 82 should be finished smoothly to avoid scraping on the bottom of the adjusting wing 70, and should be slightly chamfered to help guide the pin 82 into a hole 84 in the adjusting wing 70. The outer edge of the bottom of the pin body 82*b* may also be chamfered to reduce wear on the socket 80. The spring 83 should be of a length and strength that will bias the pin 82 without applying undue pressure against the bottom of the adjusting wing 70 during the adjustment operation, as this will wear on the underside of the adjusting wing 70 and may also lift the adjusting wing 70 so that it scrapes against the wheel retaining plate 34, causing further wear on the adjusting wing 70.

Preferably the container adjusting mechanism is utilized in a vendor of square configuration, as described herein, with or without removable product bin panels, and the notches 86 are provided adjacent to a corner of the product bin 8 to allow some maneuverability in the adjusting operation. However, the adjusting mechanism described herein can also be used in other configurations of vendor, although the tool 90 may in some cases may require some modification for easy access to the adjusting mechanism. Preferably the holes 84 are numbered for convenience of maintenance personnel.

It will be appreciated that the adjusting mechanism permits the adjustment of the container size without the use of any special tool. Maintenance personnel need only depress the pin 82, for example using a pen or other sharp object, until the head 82*a* of the pin 82 has receded completely from the hole 84 in the adjusting wing 70, at which point the adjusting wing 70 can be manually rotated to a new position. The tool 90 is provided for convenience, however, to enable service personnel to effect this operation easily, in controlled increments, and using only a single hand. In either case, it is unnecessary to disassemble the vendor in order to adjust the container size. The adjustment can be made either manually or with the tool 90 described above, simply by removing the top 10 and emptying the product bin 8.

The invention having thus been described by way of example with reference to a preferred embodiment, it will be apparent to those skilled in the art that certain modifications and adaptations may be made without departing from the scope of invention. The invention is intended to include all such modifications and adaptations which fall within the scope of the appended claims.

I claim:

1. A bulk vendor having a product bin disposed above a dispensing wheel having containers for advancing articles contained in the product bin toward a dispensing aperture disposed beneath the dispensing wheel, the dispensing wheel comprising a series of evenly spaced compartments, an adjusting wing having evenly spaced container openings formed therein and a barrier wall depending from an edge of each container opening into one of said compartments in the dispensing wheel, said adjusting wing being releasably fixed rotationally to said dispensing wheel and defining a container beneath each container opening in the adjusting wing, whereby the size of the containers may be adjusted by rotating the adjusting wing relative to the dispensing wheel, and whereby means for rotationally fixing the adjusting wing to the dispensing wheel comprises a depressible pin engaged between the dispensing wheel and the adjusting wing.

2. The bulk vendor defined in claim 1 whereby the depressible pin projects from a socket in the dispensing wheel into a hole in the adjusting wing.

3. The vendor defined in claim 2 wherein the dispensing wheel comprises a wing carrier seated on the spokes of a toothed wheel.

4. The vendor defined in claim 2 in which the pin includes a body larger than its head.

5. The vendor defined in claim 2 wherein the pin is biased by a spring to project into a hole in the adjusting wing, the spring having oversized coils on each end to frictionally engage the socket and a body of the pin.

6. The vendor defined in claim 2 wherein the pin is provided with a bevelled head.

7. The vendor defined in claim 2 wherein the adjusting wing includes a series of holes spaced according to the desired incremental change in size of the containers.

8. The vendor defined in claim 7 wherein the dispensing wheel and adjusting wing are retained by a wheel retaining plate, and notches are provided in an edge of the wheel retaining plate adjacent to the periphery of the dispensing wheel.

9. The vendor defined in claim 8 including a tool for adjusting the size of the containers, the tool having an axial extension for depressing the pin and a radial tooth for engaging one of said notches in the retaining plate, whereby the container size may be adjusted by inserting the tool to depress the pin and engage the tooth in the notch, and rotating the tool to rotate the adjusting wing relative to the dispensing wheel.

* * * * *